United States Patent
Chen et al.

(10) Patent No.: US 9,621,391 B2
(45) Date of Patent: Apr. 11, 2017

(54) METHODS AND APPARATUSES TO IMPROVE RECEPTION OF DIRECT DETECTION OPTICAL SIGNALS

(71) Applicant: Huawei Technologies Co., Ltd., Shenzhen (CN)

(72) Inventors: Chen Chen, Ottawa (CA); Chuandong Li, Ottawa (CA); Zhuhong Zhang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 365 days.

(21) Appl. No.: 14/252,225

(22) Filed: Apr. 14, 2014

(65) Prior Publication Data

US 2016/0212003 A1  Jul. 21, 2016

Related U.S. Application Data

(60) Provisional application No. 61/881,791, filed on Sep. 24, 2013.

(51) Int. Cl.
*H04B 10/06* (2006.01)
*H04B 10/12* (2006.01)
(Continued)

(52) U.S. Cl.
CPC ... *H04L 27/2627* (2013.01); *H04B 10/25137* (2013.01); *H04B 10/516* (2013.01);
(Continued)

(58) Field of Classification Search
None
See application file for complete search history.

(56) References Cited

U.S. PATENT DOCUMENTS

| 2004/0062317 A1* | 4/2004 | Uesugi | H04B 1/7097 375/260 |
| 2005/0190848 A1* | 9/2005 | Kiyanagii | H04B 7/10 375/260 |

(Continued)

FOREIGN PATENT DOCUMENTS

| CN | 101036362 A | 9/2007 |
| CN | 101778493 A | 7/2010 |

(Continued)

OTHER PUBLICATIONS

Mehdi, Ch. 2 Von Neumann Architecture, 2012, http://www2.cs.siu.edu/~cs401/Textbook/ch2.pdf.*

(Continued)

*Primary Examiner* — Ken N Vanderpuye
*Assistant Examiner* — Jai Lee
(74) *Attorney, Agent, or Firm* — Slater Matsil, LLP (57) ABSTRACT

System and method embodiments are provided for improving reception of direct detection optical signals. In an embodiment, a method for optical transmission includes bit loading and power loading, with a digital signal processor (DSP), transmission bits of an orthogonal frequency-division multiplexing (OFDM) signal; calculating, with the DSP, a signal-signal beat interference (SSBI) component of the bit and power loaded OFDM signal by modulating each subcarrier with a symbol; and subtracting, with the DSP, the calculated SSBI component from the bit and power loaded OFDM signal.

21 Claims, 10 Drawing Sheets

(51) Int. Cl.
| | |
|---|---|
| H04L 27/26 | (2006.01) |
| H04L 25/03 | (2006.01) |
| H04L 25/06 | (2006.01) |
| H04B 10/2513 | (2013.01) |
| H04B 10/548 | (2013.01) |
| H04B 10/69 | (2013.01) |
| H04B 10/516 | (2013.01) |

(52) U.S. Cl.
CPC ....... *H04B 10/548* (2013.01); *H04B 10/6971* (2013.01); *H04L 25/03343* (2013.01); *H04L 25/06* (2013.01); *H04L 27/2626* (2013.01)

(56) References Cited

U.S. PATENT DOCUMENTS

| | | | | |
|---|---|---|---|---|
| 2005/0191961 | A1* | 9/2005 | Kunieda | H04B 3/23 455/24 |
| 2006/0067428 | A1 | 3/2006 | Poon | |
| 2006/0221808 | A1* | 10/2006 | Shirakata | H04B 7/0848 370/203 |
| 2012/0063532 | A1* | 3/2012 | Yoshimoto | H04J 11/004 375/285 |
| 2012/0243876 | A1* | 9/2012 | Tang | H04B 10/548 398/135 |
| 2013/0272698 | A1* | 10/2013 | Jin | H04L 27/2628 398/43 |
| 2014/0119726 | A1* | 5/2014 | Wei | H04B 10/6971 398/38 |

FOREIGN PATENT DOCUMENTS

| | | |
|---|---|---|
| CN | 102176702 A | 9/2011 |
| EP | 1591335 A1 | 11/2005 |
| WO | 2007066907 A1 | 6/2007 |

OTHER PUBLICATIONS

Bedeer et al., A Novel Algorithm for Joint Bit and Power Loading for OFDM Systems with Unknown Interference, 2012, IEEE. pp. 3579-3584.*
Peng et al., Spectrally Efficient Direct-Detected OFDM Transmission Incorporating a Tunable Frequency Gap and an Iterative Detection Technique, 2009, IEEE, pp. 5723-5735.*
Peng et al., Spectrally Efficient direct-detected OFDM transmission employing an iterative estimation and cancellation technique, 2009, Optical Society of America, pp. 9099-9111.*
International Search Report and Written Opinion of the International Searching Authority received in Patent Cooperation Treaty Application No. PCT/CN2014/087086 mailed Dec. 31, 2014, 12 pages.
Hsu, D.Z. et al., "SSII Cancellation in an EAM-Based OFDM-IMDD Transmission System Employing a Novel Dynamic Chirp Model," Optic Express 533, vol. 21, No. 1, Jan. 14, 2013, 11 pages.
Peng, W.R. et al., "Experimental Demonstration of a Coherently Modulated and Directly Detected Optical OFDM System Using an RF-Tone Insertion," Optical Fiber Communication/National Fiber Optic Engineers Conference, Feb. 24-28, 2008, 3 pages.
Peng, W.R. et al., "Spectrally Efficient Direct-Detected OFDM Transmission Incorporating a Tunable Frequency Gap and an Iterative Detection Techniques," Journal of Lightwave Technology, vol. 27, No. 24, Dec. 15, 2009, 13 pages.

\* cited by examiner

METHODS AND APPARATUSES TO IMPROVE RECEPTION OF DIRECT DETECTION OPTICAL SIGNALS

CROSS-REFERENCE TO RELATED APPLICATIONS

The present application claims the benefit of U.S. Provisional Patent Application No. 61/881,791 filed Sep. 24, 2013 and entitled "Method and Apparatus for Direct-Detected Optical Signal Transmission," which is incorporated herein by reference as if reproduced in its entirety.

TECHNICAL FIELD

The present invention relates to a method and apparatus for optical communications, and, in particular embodiments, to a method and apparatus for direct-detected optical signal transmission.

BACKGROUND

Signal-signal beat interference (SSBI) causes performance degradation of direct detection orthogonal frequency division multiplexing (OFDM) systems. Assuming an optical complex modulator is used, the optical field E at the modulator output consists of a dc carrier and a digital signal s:

$$E(n) = a_0 + s(n)$$

The electrical signal after direct detection, y, can be represented by $$y(n) = |E(n)|^2 = |a_0|^2 + a_0 \cdot s^*(n) + a_0^* \cdot s(n) + |s(n)|^2$$

The last term represents SSBI. When dealing specifically with an OFDM signal, the optical field can be represented as $$E(n) = a_0 + s(n) = a_0 + \sum_{k=-N/2}^{N/2} a_k \cdot \exp(j2\pi nk/N)$$

The electrical signal after direct detection can be represented as $$y(n) = |E(n)|^2 =$$

$$|a_0|^2 + a_0^* \sum_{k=-N/2}^{N/2} a_k \cdot \exp(j2\pi nk/N) + a_0 \sum_{k=-N/2}^{N/2} a_k^* \cdot \exp(-j2\pi nk/N) +$$

$$\sum_{k=-N/2}^{N/2} a_k \cdot \exp(j2\pi nk/N) \sum_{k=-N/2}^{N/2} a_k^* \cdot \exp(-j2\pi nk/N)$$

The last term in the equation above is SSBI.

Figure 1:
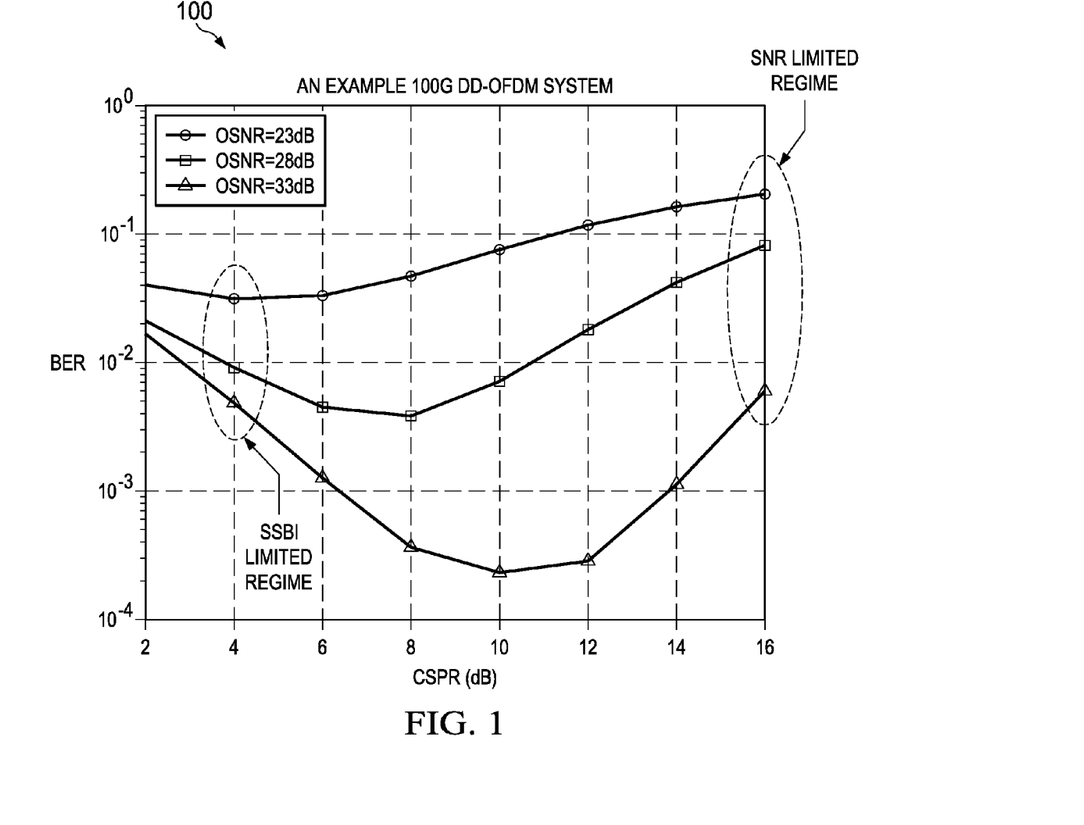
FIG. 1 illustrates BER vs. CSPR for an example OFDM system.

Carrier-signal power ratio (CSPR) is a key parameter in a direct detection OFDM system. FIG. 1 is a graph 100 that shows a typical bit error rate (BER) and CSPR relationship. When CSPR is small, BER is worse because SSBI power is increased relative to signal power, whereas when CSPR is large, BER is also worse because system noise (usually approximated by Gaussian) dominates. The sweet spot for CPSR varies with system noise. In this illustration, system noise only consists of optical noise and is defined by optical signal-to-noise ratio (OSNR). Unlike the Gaussian nature of system noise, SSBI is deterministic relative to the signal itself. This deterministic nature can be exploited to improve error performance in an SSBI limited regime.

Figure 2:
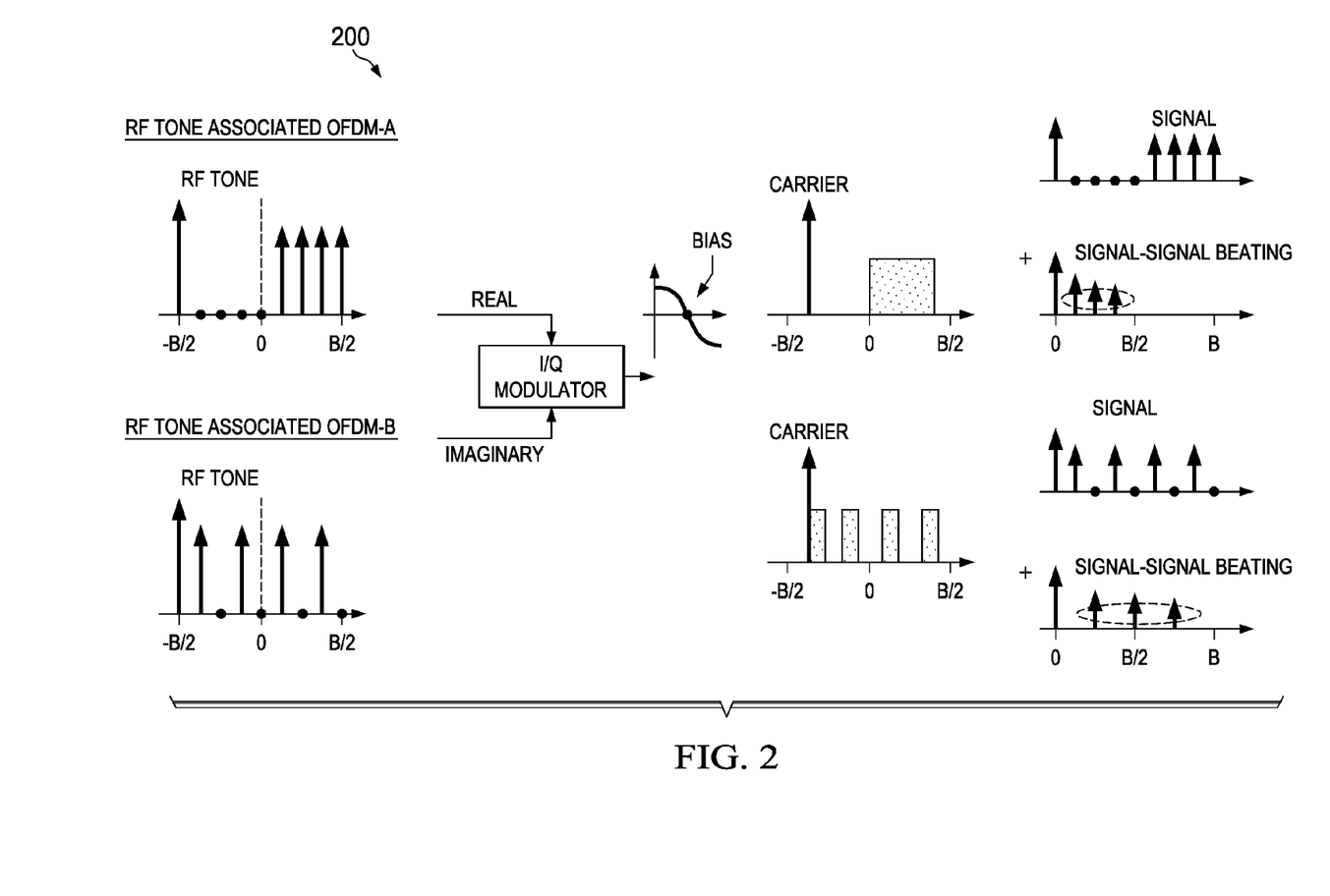
FIG. 2 illustrates a first gapped and interleaved subcarrier scheme.

One method reserves a gap between the dc carrier and OFDM signal. As a result, SSBI falls into the gap after direct detection and its distortion to signal becomes smaller. Another method is to use only the odd subcarriers to carry data symbols. Therefore SSBI falls on the even subcarriers and does not cause interference to the signal itself. FIG. 2 is a diagram 200 illustrating these two schemes. An obvious drawback of these two schemes is reduced spectrum efficiency, so larger bandwidth hardware and higher sampling ADC/DAC are required.

Figure 3:
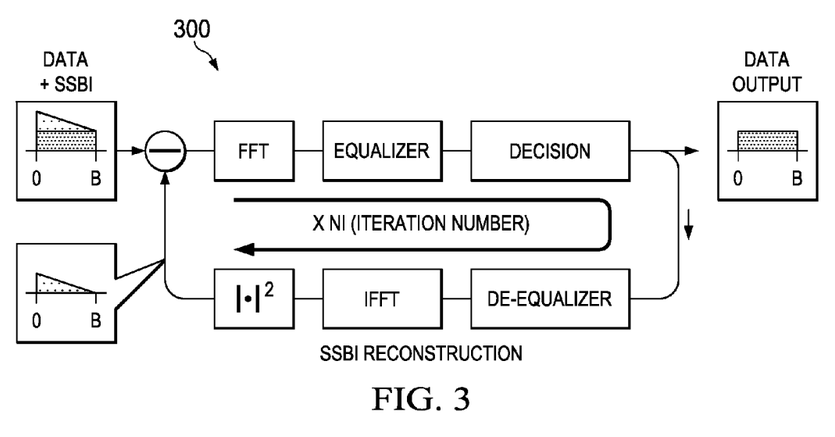
FIG. 3 illustrates a second gapped and interleaved subcarrier scheme.

Another method is to perform iterative SSBI cancellation at the RX side as shown in FIG. 3, which illustrates a flowchart for a SSBI cancellation method 300 at the RX side. SSBI is reconstructed from decision symbols and subtracted from the received electrical signal. Because of decision error, multiple iterations are often needed to achieve sizeable gain, which renders this method more computational complex.

SUMMARY

In accordance with an embodiment, a method for optical transmission includes bit loading and power loading, with a digital signal processor (DSP), transmission bits of an orthogonal frequency-division multiplexing (OFDM) signal; calculating, with the DSP, a signal-signal beat interference (SSBI) component of the bit and power loaded OFDM signal by modulating each subcarrier with a symbol; and subtracting, with the DSP, the calculated SSBI component from the bit and power loaded OFDM signal.

In accordance with an embodiment, a network component configured for optical transmission includes a processor and a computer readable storage medium storing programming for execution by the processor, the programming including instructions to: bit load and power load transmission bits of an orthogonal frequency-division multiplexing (OFDM) signal; calculate a signal-signal beat interference (SSBI) component of the bit and power loaded OFDM signal by modulating each subcarrier with a symbol; and subtract the calculated SSBI component from the bit and power loaded OFDM signal.

In accordance with an embodiment, a network component for optical transmission includes an optical transmitter; a direct detection component to detect an optical signal from the optical transmitter and convert the optical signal into an orthogonal frequency-division multiplexing (OFDM) electrical signal; and a digital signal processor (DSP) coupled to the direct detection component and configured to: bit load and power load transmission bits of the OFDM electrical signal; calculate a signal-signal beat interference (SSBI) component of the bit and power loaded OFDM electrical signal by modulating each subcarrier with a symbol; and subtract the calculated SSBI component from the bit and power loaded OFDM electrical signal.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Disclosed herein are system and methods for mitigating signal-signal beat interference (SSBI) due to the direct detection receiver. An embodiment digital signal processing (DSP) method mitigates SSBI due to the direct detection receiver. This DSP method can be used in all three typical types of optical OFDM transmitter for direct detection, including both the complex modulator and intensity modulator. SSBI compensation utilizes equalization of optical channel and hardware response, which are integrated into the SSBI canceller to achieve performance gain. Two implementation options for SSBI canceller are provided herein.

An embodiment method performs a TX-side SSBI cancellation. Because transmitted symbols are known, no iteration is required to achieve sizeable performance gain. This reduces computation complexity and saves DSP resources. Also, spectrum efficiency is not compromised using this method.

An embodiment improves transmission capacity or error performance of a direct detection optical system. An embodiment provides a more hardware efficient and less costly solution than other approaches. Embodiments may be implemented in, e.g., 100 G, 400 G and beyond optical transmission systems.

An embodiment transmitter (TX) DSP method mitigates signal-signal beat interference (SSBI) due to the direct detection receiver. This method improves transmission capacity and/or error performance for an optical transmission system using a direct detection receiver. The optical signal can be generally expressed as $E(n)=a_0+s(n)$. While embodiments are presented assuming $s(n)$ represents an OFDM signal, the SSBI mitigation method can be extended to other digitally-generated optical signals.

In an embodiment, a method for optical transmission includes bit loading and power loading, with a digital signal processor (DSP), transmission bits of an orthogonal frequency-division multiplexing (OFDM) signal; calculating, with the DSP, a signal-signal beat interference (SSBI) component of the bit and power loaded OFDM signal by modulating each subcarrier with a symbol; and subtracting, with the DSP, the SSBI component from the bit and power loaded OFDM signal. In an embodiment, the method also includes equalizing the channel. In an embodiment, the SSBI component is calculated according to an estimated chromatic dispersion (CD) of an optical channel and/or according to an estimated hardware radio-frequency (RF) response. In an embodiment, the method includes equalizing a subcarrier phase after subtracting the SSBI component from the bit and power loaded OFDM signal. In an embodiment, calculating the SSBI component comprises determining $\sigma_k$ according to $$\sigma_k = \frac{1}{a_0^*} \sum_{k=m+1}^{N} a_m \cdot a_{m-k}^* \cdot \exp(j2\pi nk/N)$$

wherein $\sigma_k$ is an SSBI contribution to be subtracted, $a^*_0$ is a complex conjugate of dc carrier, $a_m$ is complex-valued data on m-th subcarrier, $a^*_{m-k}$ is complex conjugate of the complex-valued data on (m−k)-th subcarrier, j is an imaginary part of a complex number, k is a subcarrier index, n is a digital sample index in time, m is a subcarrier index, and N is a fast Fourier transform (FFT) size in a receiver DSP. In another embodiment, calculating the SSBI component includes determining $\sigma_k$ according to $$\sigma_k = \frac{1}{|H_k| \cdot a_0^*} \sum_{k=m+1}^{N} a_m \cdot a_{m-k}^* \cdot |H_m| \cdot |H_{m-k}| \exp(j2\pi nk/N)$$

wherein $\sigma_k$ is the SSBI component for the $k^{th}$ subcarrier, $H_m$ is a complex-valued channel response from an $m^{th}$ subcarrier, $a_k$ is the complex-value data carried on the kth subcarrier, j denoted the square root of −1, k is the OFDM subcarrier index, n is a sample index in time, and N is a fast Fourier transform (FFT) size used in an OFDM receiver.

In an embodiment, a network component configured for optical transmission includes a processor; and a computer readable storage medium storing programming for execution by the processor, the programming including instructions to: bit load and power load transmission bits of an orthogonal frequency-division multiplexing (OFDM) signal; calculate a signal-signal beat interference (SSBI) component of the bit and power loaded OFDM signal by modulating each subcarrier with a symbol; and subtract the SSBI component from the bit and power loaded OFDM signal. In another embodiment, a network component for optical transmission includes an optical transmitter; a direct detection component to detect an optical signal from the optical transmitter and convert the optical signal into an orthogonal frequency-division multiplexing (OFDM) electrical signal; and a digital signal processor (DSP) coupled to the direct detection component and configured to: bit load and power load transmission bits of the OFDM electrical signal; calculate a signal-signal beat interference (SSBI)

component of the bit and power loaded OFDM electrical signal by modulating each subcarrier with a symbol; and subtract the SSBI component from the bit and power loaded OFDM electrical signal.

Figure 4:
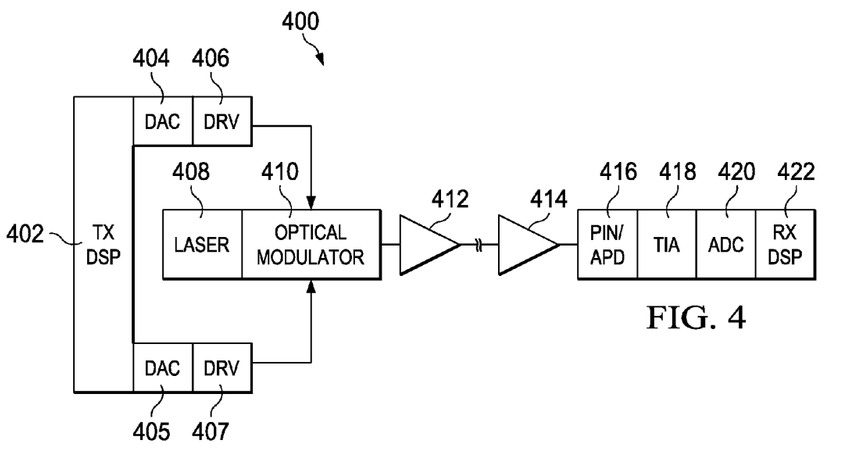
FIG. 4 illustrates a direct detection optical OFDM system with complex modulator.
Figure 5:
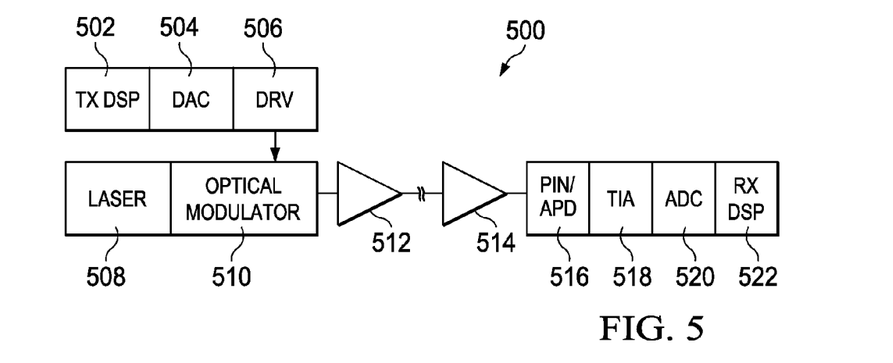
FIG. 5 illustrates a direct detection optical OFDM system with intensity optical modulator.
Figure 6:
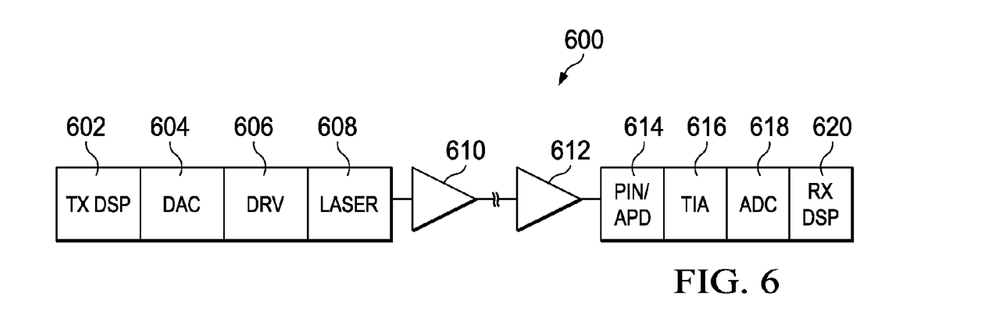
FIG. 6 illustrates a direct detection optical OFDM system with DML or EML.

FIGS. 4-6 illustrate three typical types of optical OFDM transmitters for direct detection. For all three cases, an optical filter can be used after the optical modulator or laser to produce single-side band (SSB) signals. An embodiment interference cancellation method can apply to all three cases, with or without the optical filter.

FIG. 4 shows a block diagram illustrating an embodiment system 400 for optical OFDM transmitters for direct detection. The system 400 includes a TX DSP 402, digital-to-analog convertors (DACs) 404, 405, optical modulator drivers (DRVs) 406, 407, a laser 408, a complex optical modulator 410, a TX amplifier 412, a RX amplifier 414, a p-type, intrinsic, n-type diode (PIN)/avalanche photodiode (APD) 416, a transimpedance amplifier (TIA) 418, an analog-to-digital convertor (ADC) 420, and a RX DSP 422. The TX DSP 402 implements channel encoding and modulation of the data to be transmitted. Each of the DACs 404, 405 convert the digital signal from the TX DSP to an analog signal. Each of the DRV 406, 407 is an RF amplifier to bring the DAC output to an appropriate driving voltage for the optical modulator 410. The laser 408 is an optical source for the complex optical modulator 410 converts an electrical driving signal to an optical signal. The TX amplifier 412 and the RX amplifier 414 compensate for any possible signal attenuation loss during transmission. In an embodiment the RX amplifier 414 is optional. The PIN or APD 416 coverts the optical signal to an electrical signal. The TIA 418 coverts the PIN or APD 416 output current to voltage with some amplification. The ADC 420 converts the analog signal to a digital signal to be processed by the RX DSP 422. The RX DSP 422 equalizes, demodulates, and decodes the received signal. In an embodiment, a complex-valued OFDM signal is converted to optical domain via a complex optical modulator 410. In an embodiment, the complex optical modulator 410 is an integrated quad Mach-Zehnder (IQMZ) or a dual drive Mach-Zehnder (DDMZ). The components of system 400 may be arranged substantially as shown in FIG. 4.

FIG. 5 shows a block diagram illustrating an embodiment system 500 for optical OFDM transmitters for direct detection. System 500 includes a TX DSP 502, a DAC 504, a DRV 506, a laser 508, an intensity optical modulator 510, a TX amplifier 512, a RX amplifier 514, a PIN/APD 516, a TIA 518, an ADC 520, and a RX DSP 522. In system 500, the OFDM signal is encoded in a real-valued signal. The OFDM signal can be converted to the optical domain via an intensity optical modulator 510. In an embodiment, the intensity optical modulator 510 is a MZ or an electro-absorption modulator (EAM). The components of system 500 may be arranged as shown in FIG. 5.

FIG. 6 shows a block diagram illustrating an embodiment system 600 for optical OFDM transmitters for direct detection. System 600 includes TX DSP 602, DAC 604, DRV 606, laser 608, TX amplifier 610, RX amplifier 612, PIN/APD 614, TIA 616, ADC 618, and RX DSP 620. In system 600, the real-valued OFDM signal also can be converted to the optical domain via a directly modulated laser (DML) or an externally modulated laser (EML). The components of system 600 may be arranged as shown in FIG. 6.

The operation principle of TX SSBI cancellation is represented in the following paragraphs. Assuming the use of a complex modulator (as in FIG. 4), the optical field containing the OFDM signal can be expressed as $$E(n) = a_0 + s(n) = a_0 + \sum_{k=-N/2}^{N/2} a_k \cdot \exp(j2\pi nk/N)$$

where E(n) is the optical field of the nth component, $a_0$ is direct current (DC) carrier of the optical OFDM signal, $a_k$ is the complex-value data carried on the $k^{th}$ subcarrier, s(n) is digital signal of the nth component of the optical OFDM signal, k is the OFDM subcarrier index, j denotes the imaginary number (i.e., the square root of −1), n is a sample index in time, and N is the fast Fourier transform (FFT) size used in the OFDM RX DSP.

The electrical signal after direct detection can then be expressed as $$y(n) = |E(n)|^2 =$$
$$|a_0|^2 + a_0^* \sum_{k=-N/2}^{N/2} a_k \cdot \exp(j2\pi nk/N) + a_0 \sum_{k=-N/2}^{N/2} a_k^* \cdot \exp(-j2\pi nk/N) +$$
$$\sum_{k=-N/2}^{N/2} a_k \cdot \exp(j2\pi nk/N) \sum_{k=-N/2}^{N/2} a_k^* \cdot \exp(-j2\pi nk/N)$$

where y(n) is the nth sample of the electrical signal in time after direct detection of the optical signal.

The last term in the equation for y(n) above is the SSBI. At each subcarrier frequency, the SSBI can be further expressed as $$\sigma_k = \sum_{k=m+1}^{N} a_m \cdot a_{m-k}^* \cdot \exp(j2\pi nk/N)$$

where $\sigma_k$ is the SSBI and k is the OFDM subcarrier index.

Therefore, to achieve SSBI cancellation, instead of using a symbol with ideal constellation $a_k$, each subcarrier is modulated with a symbol where SSBI contribution is subtracted:

$$b_k = a_k - \frac{\sigma_k}{a_0^*}$$

where $b_k$ is the complex-value data carried on the $k^{th}$ subcarrier after subtracting the SSBI contribution.

Amplitude scaling depends on the carrier-signal power ratio (CSPR). In addition, the optical channel has a certain amplitude and phase response. For example, chromatic dispersion (CD) would lead to frequency-dependent phase rotation, and hardware response may impart different amplitude and phase changes to different subcarriers. These are taken into account for SSBI cancellation. Failure to do so may result in a performance penalty instead of a performance gain. A generalized expression to account for optical channel is $$\sigma_k = \sum_{k=m+1}^{N} a_m H(m) a_{m-k}^* H^*(m-k) \exp(j2\pi nk/N)$$

where H(m) is the channel response for the $m^{th}$ subcarrier.

Furthermore, SSBI cancellation can be readily extended to intensity modulator (e.g. EML and DML as in FIGS. 5 and 6). The optical field containing the OFDM signal after an intensity modulator can be described as $$E(n) = \sqrt{a_0 + s(n)} \cong a_0 \cdot \left(1 + \frac{1 - j\alpha_0}{2} s(n) + \frac{1 + \alpha_0^2 + 4j\alpha_1}{8} |s(n)|^2\right) \cong$$

$$a_0 \cdot \left(1 + \frac{1}{2}\sqrt{1 + \alpha_0^2} \, e^{-j\theta_a} s(n) - \frac{1}{8}(1 + \alpha_0^2)|\sec\theta_A||s(n)|^2 e^{j\theta_A}\right)$$

where $\theta_A$ is proportional to the chirp parameters of an optical modulator. In an embodiment, $\theta_A$ is needed to calculate the intermixing terms. More information concerning $\theta_A$ may be found in D.-Z. Hsu et al. "SSII cancellation in an EAM-based OFDM-IMDD transmission system employing a novel dynamic chirp model," Optics Express, vol. 21, no. 1, January 2013, which is incorporated herein by reference in its entirety.

The electrical signal after direct detection can be then expressed as $$|E(n)|^2 = |a_0|^2 + \frac{1}{2}\sqrt{1 + a_0^2} \cos\theta_a \sum_{k=-N/2}^{N/2} a_k \cdot e^{j\pi nk/N} +$$

$$\left(\frac{1 + \alpha_0^2}{4} - \frac{1}{8}(1 + \alpha_0^2)|\sec\theta_A|e^{j\theta_A}\right)|s(n)|^2$$

where $\alpha_0$, denotes the DC carrier.

The last term is SSBI and $$|s(n)|^2 = \sum_{k=-N/2}^{N/2} a_k \cdot \exp(j2\pi nk/N) \sum_{k=-N/2}^{N/2} a_k^* \cdot \exp(-j2\pi nk/N)$$

At each subcarrier frequency, the SSBI can be expressed as $$\sigma_k = \frac{1 + \alpha_0^2}{8}(2 - |\sec\theta_A|e^{j\theta_A}) \sum_{k=m+1}^{N} a_m \cdot a_{m-k}^* \exp(j2\pi nk/N)$$

Again the new symbol for each subcarrier is $$b_k = a_k - \frac{\sigma_k}{a_0^*}$$

The SSBI contribution has an identical form as that of a complex modulator, but with a different scaling term. SSBI contribution is smaller than that for the complex modulator. Moreover, hardware response can be also included in SSBI calculation. However, CD-induced phase rotation generally cannot be equalized, because a real-valued signal is required. Therefore this limits its application to a zero-dispersion or dispersion-uncompensated link, if an intensity modulator is used.

Figure 7:
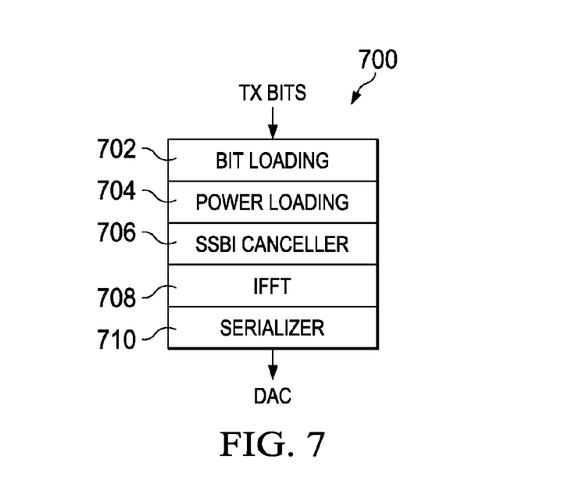
FIG. 7 illustrates a TX DSP flow containing SSBI canceller.

FIG. 7 is a diagram illustrating an embodiment method 700 for the SSBI canceller in the TX DSP flow. Bit and power loading are results of water-filling algorithm, and the SSBI canceller can be implemented immediately after. After direct detection of the optical OFDM signal, bit loading 702 and power loading 704 are performed on the electrical OFDM transmission bits. Next, SSBI cancellation 706 is performed on the bit and power loaded transmission bits. After SSBI cancellation 706, an Inverse Fast Fourier Transform (IFFT) 708 is performed on the transmission signal, and then the transmission signal are sent to a serializer 710 before being sent to a DAC, which converts the digital transmission signal to its analog form.

Figure 8:
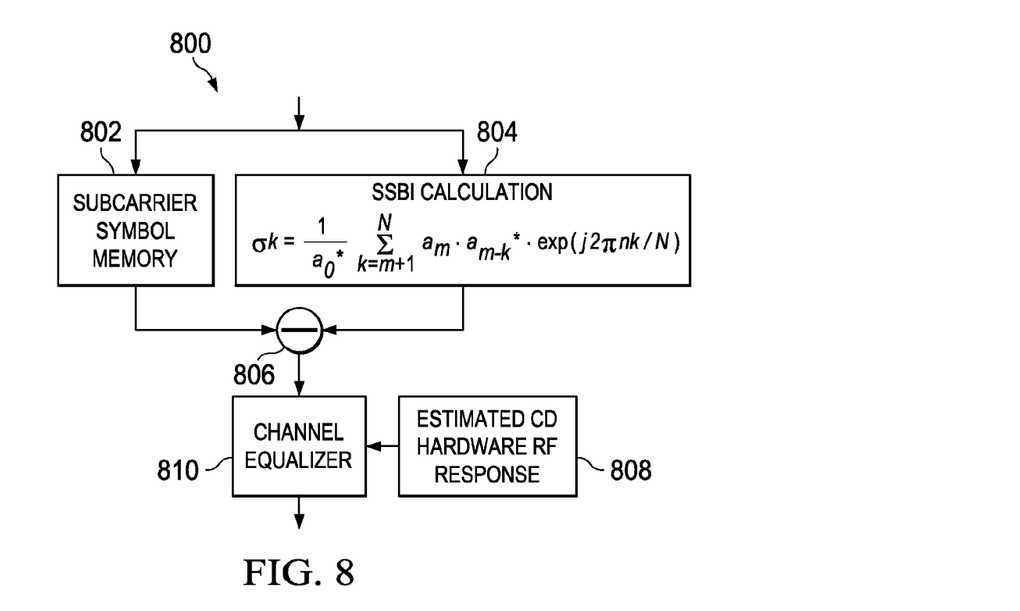
FIG. 8 illustrates a first implementation option of SSBI canceller.

FIG. 8 shows an embodiment of a SSBI canceller method 800. In one path SSBI is calculated by the SSBI calculation unit 804, and then the combiner 806 subtract the SSBI from the original data symbol that was stored in subcarrier symbol memory 802. In an embodiment t, the SSBI is determined according to the following equation:

$$\sigma_k = \frac{1}{a_0^*} \sum_{k=m+1}^{N} a_m \cdot a_{m-k}^* \cdot \exp(j2\pi nk/N)$$

A channel equalizer 810 inverts the optical channel response, which may contain chromatic dispersion (CD) and hardware response such as DAC, DRV and modulator response. In an embodiment, the channel equalizer 810 accounts for the estimated CD and estimated hardware radio-frequency (RF) response 808. This equalizer 810 can be implemented using either frequency domain equalizer (FDEQ) or finite impulse response (FIR).

Figure 9:
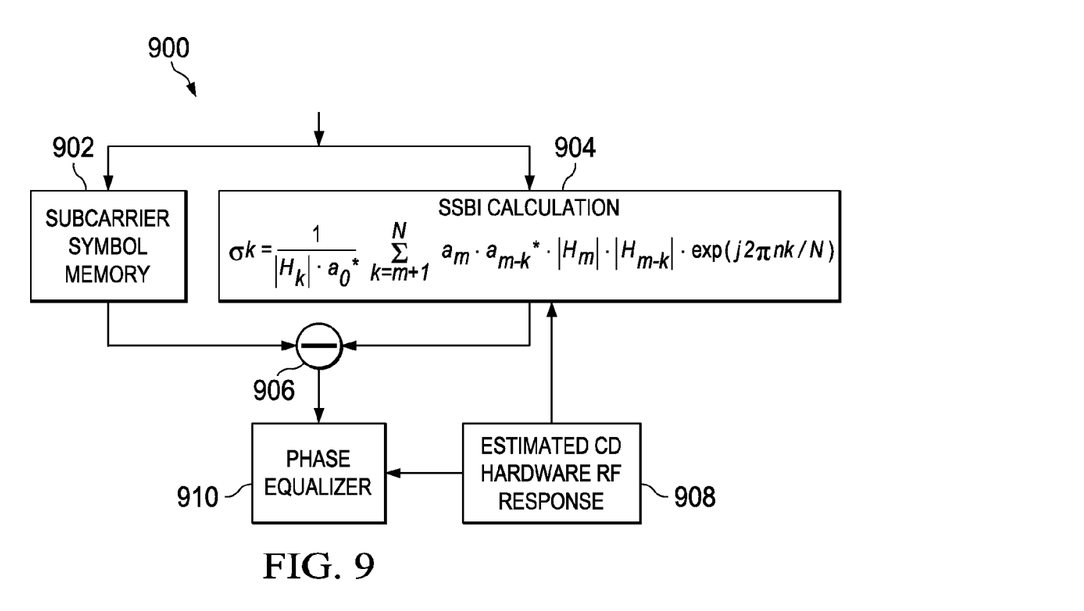
FIG. 9 illustrates a second implementation option of SSBI canceller.

FIG. 9 illustrates another embodiment of a SSBI canceller method 900. The transmission bits are stored in subcarrier symbol memory 902. An SSBI calculation is performed by SSBI calculation unit 904 and the SSBI subtracted from the transmission signal by combiner 906. In an embodiment, the SSBI calculation is performed according to the following equation:

$$\sigma_k = \frac{1}{|H_k| \cdot a_0^*} \sum_{k=m+1}^{N} a_m \cdot a_{m-k}^* \cdot |H_m| \cdot |H_{m-k}| \exp(j2\pi nk/N)$$

The SSBI adjusted transmission bits are provided to a phase equalizer 910. Both the SSBI calculation unit 904 and the phase equalizer 910 receive and incorporate an estimated CD hardware RF response in carrying out their functions. The amplitude response of optical channel is accounted for in the SSBI calculation, so subcarrier power (=amplitude) loading is not modified. In an embodiment, only the subcarrier phase is equalized after subtraction. This can be more desirable in terms of performance, especially when a water-filling algorithm is used.

Figure 10:
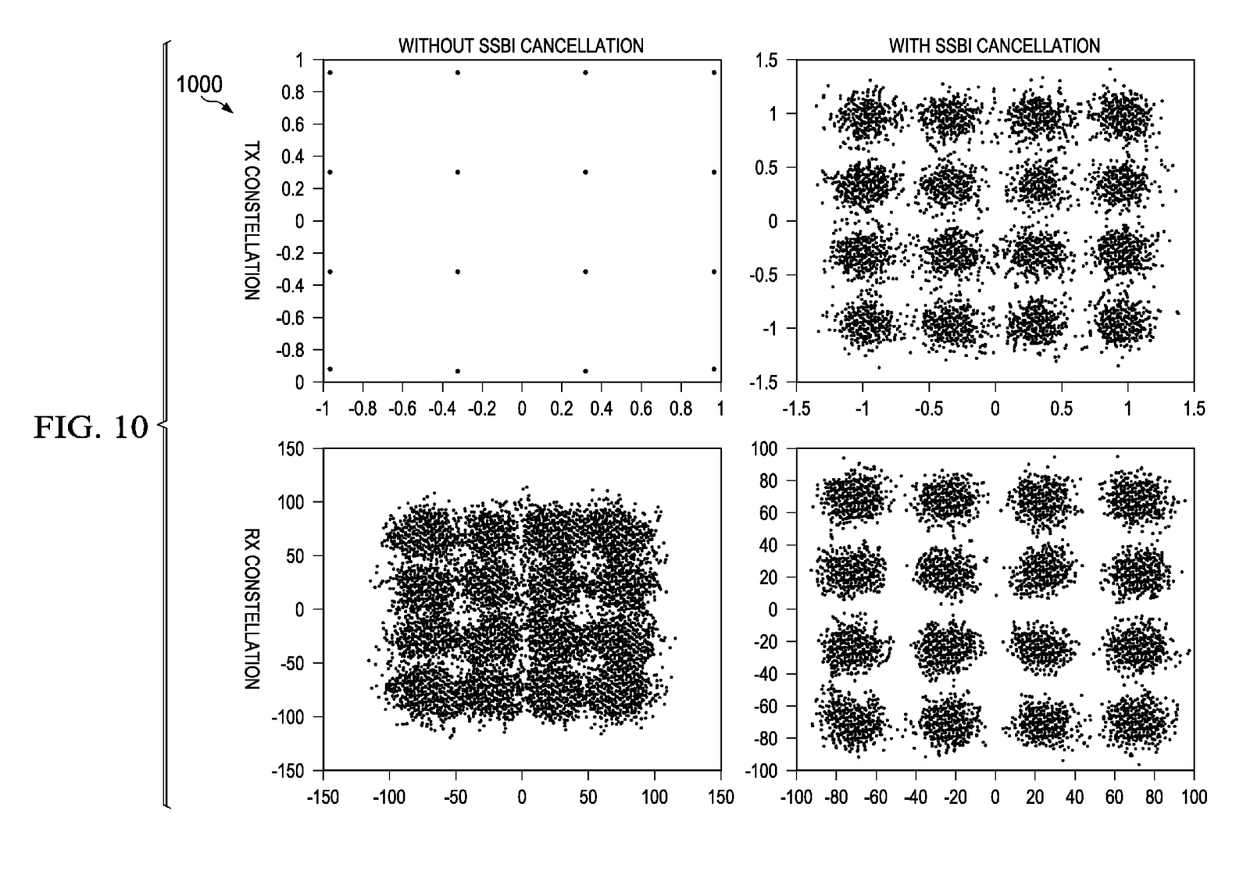
FIG. 10 illustrates a simulation example using SSBI cancellation.

FIG. 10 is a graph 1000 illustrating a simulation example using SSBI cancellation. Without SSBI cancellation, each subcarrier is loaded with an ideal constellation (for example 16 QAM), but a much worse 16 QAM constellation is received due to SSBI. With SSBI cancellation, a distorted constellation is used at the TX side, but a better constellation is observed at RX.

Figure 11:
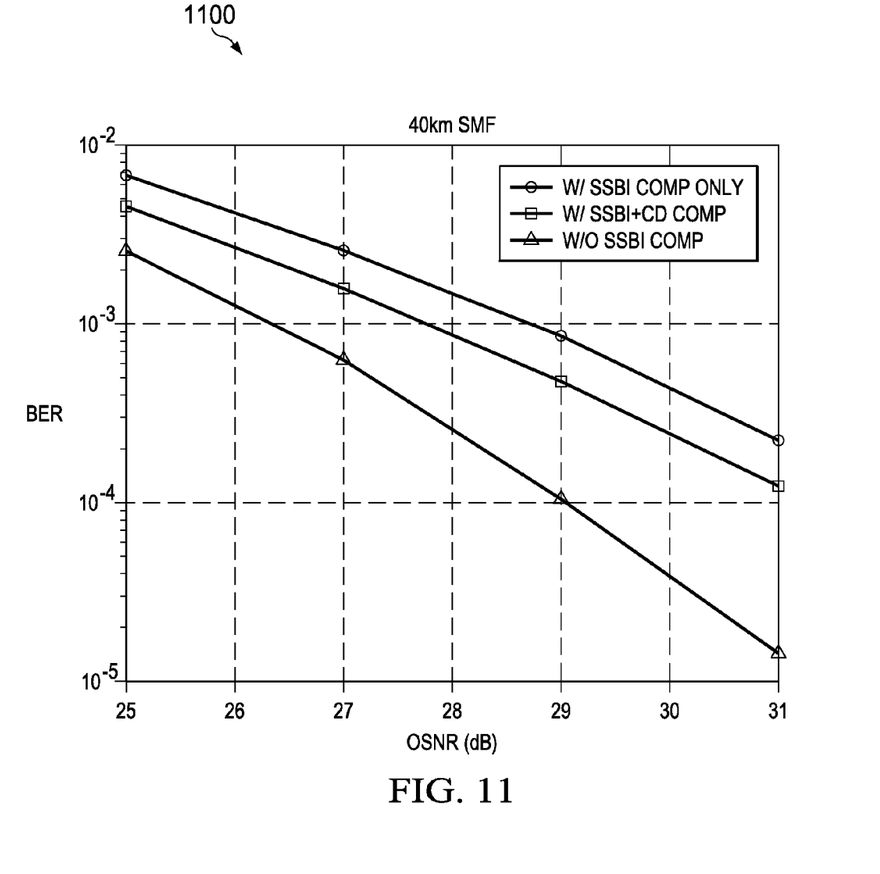
FIG. 11 illustrates BER vs. OSNR for an OFDM system and over 40 km G.652 fiber.

FIG. 11 is a graph 1100 illustrating BER versus OSNR for a direct-detection OFDM system as shown in FIG. 4, where a complex modulator is used. A transmission over 40 km G.652 fiber is assumed, and CD≈640 ps/nm at the end of the link. The lower curve shows performance benefit of using SSBI compensation. As discussed earlier the phase equalizer is used to compensate CD-induced phase rotation at TX, otherwise performance would be degraded (see upper curve).

Figure 12:
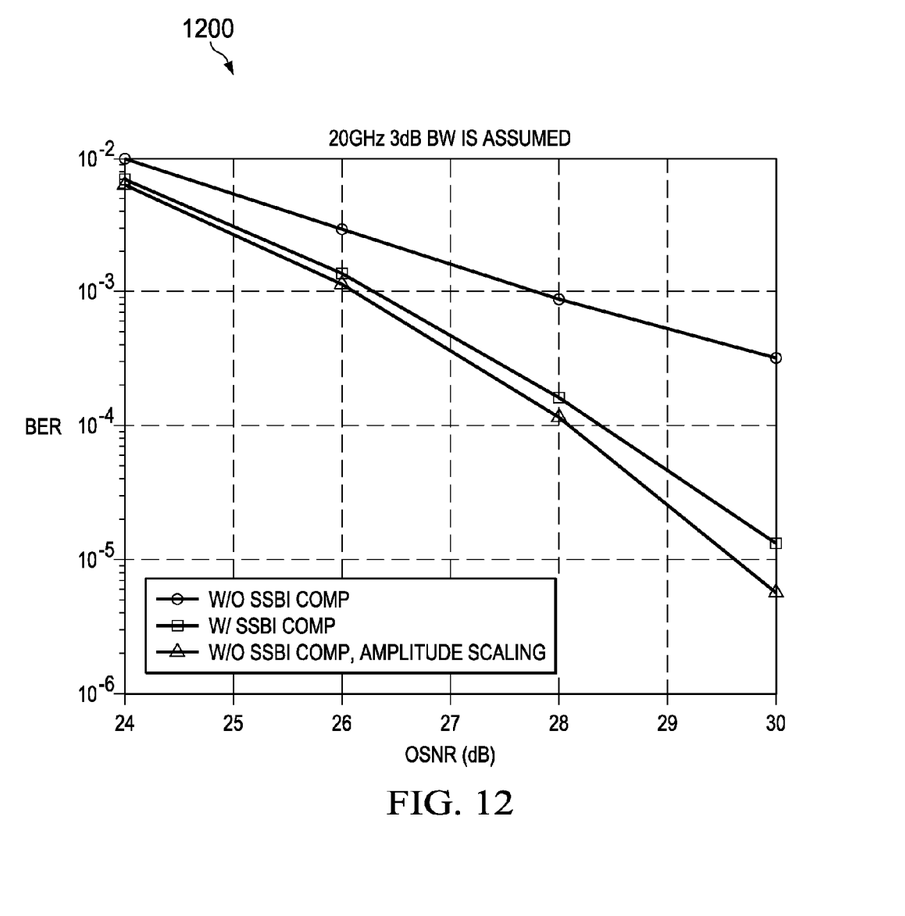
FIG. 12 illustrates BER vs. OSNR for an OFDM system with reduced hardware bandwidth.

FIG. 12 is a graph 1200 illustrating the performance benefit of SSBI compensation when hardware bandwidth is reduced. The bandwidth effect is modeled using a $4^{th}$ order Bessel filter with 20 GHz 3 dB bandwidth, and OFDM signal bandwidth is ~30 GHz. The second SSBI canceller implementation is used (see FIG. 9). The middle curve represents the case when hardware amplitude response is not used for SSBI calculation, which produces a slightly worse result compared to a full implementation.

Figure 13:
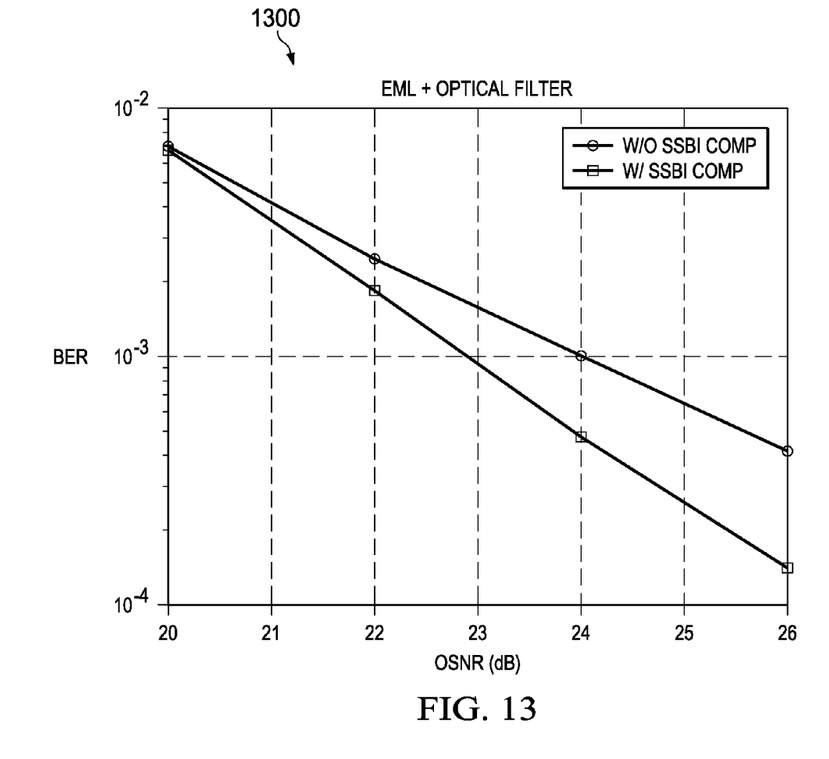
FIG. 13 illustrates BER vs. OSNR for an EML-based OFDM system.

FIG. 13 is a graph 1300 illustrating the performance benefit of SSBI compensation when an intensity modulator is used. But performance gain seems smaller than that of the complex modulator case, which is expected because of the smaller SSBI term as pointed out earlier.

Figure 14:
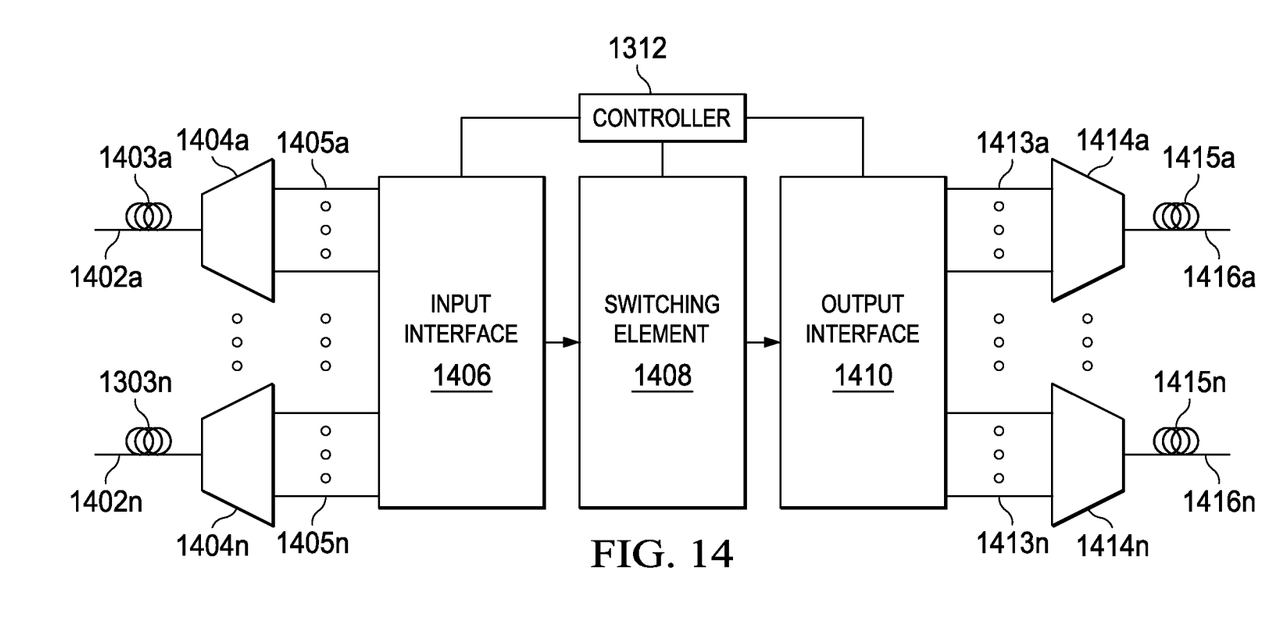
FIG. 14 is a block diagram of an embodiment optical data router.

FIG. 14 is a block diagram of an embodiment optical data router 1400. Optical data router 1400 may be used for implementing the devices and methods disclosed herein. Specific devices may utilize all of the components shown, or only a subset of the components and levels of integration may vary from device to device. Furthermore, a device may contain multiple instances of a component. Router 1400 includes one or more separators 1404, an input interface 1406, a switching element 1408, an output interface 1410, a controller 1412, and one or more combiners 1314. Each separator 1404 is configured to separate an input optical signal 1403 communicated over a communication link 1402. Separator 1404 may comprise, for example, a wavelength division demultiplexer. As used throughout this document, the phrases "wavelength division multiplexer" and "wavelength division demultiplexer" may include any optical and/or electrical components—including any hardware, software, and/or firmware—capable of processing wavelength division multiplexed signals and/or dense wavelength division multiplexed signals. In an embodiment, the input interface 1406, switching element 1408, and/or output interface 1410 include a PIC that incorporates the disclosed thermo-optic switches with thermally isolated and heat restricting pillars.

Communication link 1402 may include, for example, standard single mode fiber (SMF), dispersion-shifted fiber (DSF), non-zero dispersion-shifted fiber (NZDSF), dispersion compensating fiber (DCF), or another fiber type or combination of fiber types. In some embodiments, communication link 1402 is configured to couple router 1400 to other optical and/or electro-optical components. For example, link 1402 could couple router 1400 to a cross-connect or another device operable to terminate, switch, route, process, and/or provide access to and/or from communication link 1402 and another communication link or communication device. As used throughout this document, the term "couple" and or "coupled" refers to any direct or indirect communication between two or more elements, whether or not those elements are physically connected to one another. In some embodiments, communication link 1402 can comprise a point-to-point communication link or a portion of a larger communication network, such as a ring network, a mesh network, a star network, or other network configuration.

Optical signal 1403 may include a multiple wavelength optical signal. For example, optical signal 1403 can include at least 5 wavelength channels, at least 100 wavelength channels, or at least 250 wavelength channels. In one particular embodiment, optical signal 1403 includes 250 wavelengths having a 50 gigahertz (GHz) spacing within a 100 nanometer (nm) spectral window. In that example, the 100 nm spectral window can be located within the 1400 nm to 1650 nm low-loss window associated with optical fibers. In various embodiments, optical signal 1403 can implement one or more data formats, such as, polarization shift keying (PLSK), pulse position modulation (PPM), Multi-Protocol Label Swapping (MPLS), Generalized Multi-Protocol Label Swapping (GMPLS), non-return to zero (NRZ), return to zero (RZ), differential phase shift key (DPSK), or a combination of these or other format types.

In an embodiment, separator 1404 is configured or operates to separate optical signal 1403 into individual wavelength channels 1405 and to couple each wavelength channel 1405 to an input interface 1406. In an alternative embodiment, separator 1404 can separate optical signal 1403 into separate multiple-wavelength channels and couple those multiple-wavelength channels to input interface 1406. Wavelength channels 1405 can comprise, for example, Internet Protocol (IP) packets, voice data, video data, or any other data type and/or data format. In this particular embodiment, each wavelength channel 1405 implements a frame format that comprises one or more framing bits, a first packet label that precedes a packet data, and a second packet label that follows the packet data. Surrounding a packet data with packet labels advantageously allows for relatively simple error checking at a destination associated with each wavelength channel 1405, however this format is not required. In this example, each wavelength channel 1405 implements a Generalized Multi-Protocol Label Swapping (GMPLS) routing protocol within the first and second packet labels. Although this example implements a GMPLS routing protocol, other routing protocols or data formats may be used without departing from the scope of the present disclosure.

In an embodiment, input interface 1406 is configured to receive and process each wavelength channel 1405 associated with optical signal 1403. Input interface 1406 can comprise any optical and/or electrical components—including any hardware, software, and/or firmware—capable of processing, converting, replicating, updating, and/or swapping one or more packet labels associated with each wavelength channel 1405. In various embodiments, input interface 1406 can determine a desired routing for a packet data associated with each wavelength channel 1405 and can update a first and/or second packet label using an all-optical label swapping technique. The phrase "all-optical" refers to the performance of a desired functionality substantially free from optical-to-electrical or electrical-to-optical conversions. The "all-optical" functionality does not prohibit optical-to-electrical or electrical-to-optical conversions for use by control circuitry that contributes to the overall function of the device. For example, input interface 1406 may include a controller that receives an electrical representation of a packet label and generates a control signal that functions to modulate a swapping sequence on an optical signal.

Switching element 1408 is configured to process one or more packet data associated with wavelength channels 1405 received from input interface 1406 and directing those packet data to a desired destination. Switching element 1408 can include any optical and/or electrical components—including any hardware, software, and/or firmware—capable of switching, routing, error checking, and/or managing the one or more packet data or packet labels associated with each wavelength channel 1405. In an embodiment, the switching element 1408 includes one or more processors. In an embodiment, the switching element 1408 includes storage and/or memory which can store data and instructions that are to be executed by a processor. In an embodiment, one or more of the processors is a digital signal processor (DSP). In an embodiment, switching element 1408 can comprise a ring configuration having one or more core router nodes and at least one management node. Although this example implements a ring configuration, switching element 1408 could implement a mesh configuration, a star configuration, or any other configuration without departing from the scope of the present disclosure. In various embodiments, switching element 1408 can operate to process wavelength channels 1405 at processing speeds of, for example, at least 10 gigabits/second (Gb/s), at least 40 Gb/s, at least 100 Gb/s, or at least 160 Gb/s.

In an embodiment, switching element 1408 is configured to route one or more packet data associated with wavelength channels 1405 to an output interface 1410. Output interface 1410 can comprise any optical and/or electrical components including any hardware, software, and/or firmware capable of preparing one or more packet data associated with wavelength channels 1405 for communication from router 1400. In this example, output interface 1410 operates to communicate the one or more packet data from router 1400 to a desired destination through an appropriate wavelength channel 1413.

In an embodiment, each combiner 1414 is configured to combine output wavelength channels 1413 into one or more output optical signals 1415 for communication over a communication links 1416. In an embodiment, combiner 1414 includes, for example, a wavelength division multiplexer. The structure and function of communication link 1416 can be substantially similar to the structure and function of communication link 1402. In this example, communication links 1416 operate to couple router 1400 to other optical and/or electro-optical components.

In this example, the controller 1412 is also capable of at least partially contributing to controlling one or more functionalities associated with router 1400. That is, controller 1412 is not required to be capable of performing the desired functionality alone, but may contribute to the performance of the function as part of a larger routine. Controller 1412 can comprise any communication and/or computational device or devices, including any hardware, software, firmware, or combination thereof.

In an embodiment, in operation, the packet data associated with wavelength channels 1405 are transparent to the processing functions of router 1400. That is, in operation router 1400 does not examine the content of the packet data associated with each wavelength channel 1405. In some cases, router 1400 does examine the contents of one or more packet labels and/or other elements of a frame format associated with wavelength channels 1405. In most cases, router 1400 operates to maintain the packet data associated with wavelength channels 1405 in the optical domain. That is, the packet data associated with each wavelength channel 1405 are not subjected to an optical-to-electrical conversion by router 1400. In some cases, one or more of the packet labels and/or other elements of a frame format associated with wavelength channels 1405 can be subjected to one or more optical-to-electrical and/or electrical-to-optical conversions. In various embodiments, router 1400 may be capable of an aggregate capacity of, for example, at least 5 terabits/second (Tb/s), at least 25 Tb/s, at least 50 Tb/s, or at least 100 Tb/s.

In an embodiment, router 1400 can operate to minimize and/or avoid contention between packet data associated with optical signals 1403 and 1415 and/or wavelength channels 1405 and 1413 within switching element 1408 and/or communication links 1402 and 1416. The term "contention" as used herein refers to a process by which a packet data competes with other packet data for communication over a specific wavelength. In some cases, contention can be minimized by, for example, implementing a ring network architecture or performing wavelength conversion. Minimizing and/or avoiding contention can result in a reduction in the congestion associated with an optical signal wavelength.

The following references are related to subject matter of the present application. Each of these references is incorporated herein by reference in its entirety:

[1] D.-Z. Hsu et al. "SSII cancellation in an EAM-based OFDM-IMDD transmission system employing a novel dynamic chirp model," Optics Express, vol. 21, no. 1, January 2013.

[2] W.-R. Peng et al, "Experimental Demonstration of a Coherently Modulated and Directly Detected Optical OFDM System Using an RF-Tone Insertion," Optical Fiber Communication Conference, February 2008.

[3] W.-R. Peng et al, "Spectrally efficient direct-detected OFDM transmission incorporating a tunable frequency gap and an iterative detection techniques," Journal of Lightwave Technology, vol. 27, no. 24, October 2009.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method for optical transmission, comprising:
    bit loading and power loading, with a digital signal processor (DSP), transmission bits of an orthogonal frequency-division multiplexing (OFDM) signal;
    calculating, with the DSP, a signal-signal beat interference (SSBI) component of the bit and power loaded OFDM signal by modulating each subcarrier with a symbol, wherein the SSBI component is determined according to a complex conjugate of a dc carrier, a complex-valued data on one or more subcarriers, and a complex conjugate of a complex-valued data on one or more of the subcarriers;
    subtracting, with the DSP, the SSBI component from the bit and power loaded OFDM signal to generate an adjusted OFDM signal; and
    transmitting the adjusted OFDM signal.

2. The method of claim 1, further comprising equalizing a channel.

3. The method of claim 1, wherein the SSBI component is calculated according to an estimated chromatic dispersion (CD) of an optical channel.

4. The method of claim 1, wherein the SSBI component is calculated according to an estimated hardware radio-frequency (RF) response.

5. The method of claim 1, further comprising equalizing a subcarrier phase after subtracting the SSBI component from the bit and power loaded OFDM signal.

6. The method of claim 1, wherein calculating the SSBI component comprises determining $\sigma_k$ according to $$\sigma_k = \frac{1}{a_0^*} \sum_{k=m+1}^{N} a_m \cdot a_{m-k}^* \cdot \exp(j2\pi nk/N)$$

wherein $\sigma_k$ is an SSBI contribution to be subtracted, $a^*_0$ is a complex conjugate of dc carrier, $a_m$ is complex-valued data on m-th subcarrier, $a^*_{m-k}$ is complex conjugate of the complex-valued data on (m−k)-th subcarrier, j is an imaginary part of a complex number, k is a subcarrier index, n is a digital sample index in time, m is a subcarrier index, and N is a fast Fourier transform (FFT) size in a receiver DSP.

7. The method of claim 1, wherein the calculating the SSBI component comprises determining $\sigma_k$ according to $$\sigma_k = \frac{1}{|H_k| \cdot a_0^*} \sum_{k=m+1}^{N} a_m \cdot a_{m-k}^* \cdot |H_m| \cdot |H_{m-k}| \exp(j2\pi nk/N)$$

wherein $\sigma_k$ is the SSBI component for the $k^{th}$ subcarrier, $H_m$ is a complex-valued channel response from an $m^{th}$ subcarrier, $a_k$ is complex-value data carried on the $k^{th}$ subcarrier, j denoted the square root of −1, k is the OFDM subcarrier index, n is a sample index in time, and N is a fast Fourier transform (FFT) size used in an OFDM receiver.

8. A network component configured for optical transmission, the network component comprising:
a processor; and
a computer readable storage medium storing programming for execution by the processor, the programming including instructions to:
bit load and power load transmission bits of an orthogonal frequency-division multiplexing (OFDM) signal;
calculate a signal-signal beat interference (SSBI) component of the bit and power loaded OFDM signal by modulating each subcarrier with a symbol, wherein the SSBI component is determined according to a complex conjugate of a dc carrier, a complex-valued data on one or more subcarriers, and a complex conjugate of a complex-valued data on one or more of the subcarriers;
subtract the SSBI component from the bit and power loaded OFDM signal to generate an adjusted OFDM signal; and
transmit the adjusted OFDM signal.

9. The network component of claim 8, wherein the programming further comprises instructions to perform channel equalization.

10. The network component of claim 8, wherein the SSBI component is calculated according to an estimated chromatic dispersion (CD) of an optical channel.

11. The network component of claim 8, wherein the SSBI component is calculated according to an estimated hardware radio-frequency (RF) response.

12. The network component of claim 8, wherein the programming further comprises instructions to equalize a subcarrier phase after subtracting the SSBI component from the bit and power loaded OFDM signal.

13. The network component of claim 8, wherein the instructions to calculate the SSBI component comprise instructions to determine $\sigma_k$ according to $$\sigma_k = \frac{1}{a_0^*} \sum_{k=m+1}^{N} a_m \cdot a_{m-k}^* \cdot \exp(j2\pi nk/N)$$

wherein $\sigma_k$ is an SSBI contribution to be subtracted, $a^*_0$ is a complex conjugate of dc carrier, $a_m$ is complex-valued data on m-th subcarrier, $a^*_{m-k}$ is complex conjugate of the complex-valued data on (m−k)-th subcarrier, j is an imaginary part of a complex number, k is a subcarrier index, n is a digital sample index in time, m is a subcarrier index, and N is a fast Fourier transform (FFT) size in a receiver DSP.

14. The network component of claim 8, wherein the instructions to calculate the SSBI component comprise instructions to determine $\sigma_k$ according to $$\sigma_k = \frac{1}{|H_k| \cdot a_0^*} \sum_{k=m+1}^{N} a_m \cdot a_{m-k}^* \cdot |H_m| \cdot |H_{m-k}| \exp(j2\pi nk/N)$$

wherein $\sigma_k$ is an SSBI contribution to be subtracted, H is a complex-valued channel response, $a^*_0$ is a complex conjugate of dc carrier, $a_m$ is a complex-valued data on m-th subcarrier, $a^*_{m-k}$ is a complex conjugate of the complex-valued data on (m−k)-th subcarrier, j is an imaginary part of a complex number, k is a subcarrier index, n is a digital sample index in time, m is a subcarrier index, and N is a fast Fourier transform (FFT) size in a receiver DSP.

15. A network component for optical transmission, comprising:
an optical transmitter;
a direct detection component to detect an optical signal from the optical transmitter and convert the optical signal into an orthogonal frequency-division multiplexing (OFDM) electrical signal; and
a digital signal processor (DSP) coupled to the direct detection component and configured to:
bit load and power load transmission bits of the OFDM electrical signal;
calculate a signal-signal beat interference (SSBI) component of the bit and power loaded OFDM electrical signal by modulating each subcarrier with a symbol, wherein the SSBI component is determined according to a complex conjugate of a dc carrier, a complex-valued data on one or more subcarriers, and a complex conjugate of a complex-valued data on one or more of the subcarriers;
subtract the SSBI component from the bit and power loaded OFDM electrical signal to generate an adjusted OFDM signal; and
transmit the adjusted OFDM signal.

16. The network component of claim 15, wherein the DSP is further configured to perform channel equalization.

17. The network component of claim 15, wherein the SSBI component is calculated according to an estimated chromatic dispersion (CD) of an optical channel.

18. The network component of claim 15, wherein the SSBI component is calculated according to an estimated hardware radio-frequency (RF) response.

19. The network component of claim 15, wherein the DSP is further configured to equalize a subcarrier phase after subtracting the SSBI component from the bit and power loaded OFDM signal.

20. The network component of claim 15, wherein the DSP is further configured to calculate the SSBI component by determining $\sigma_k$ according to $$\sigma_k = \frac{1}{a_0^*} \sum_{k=m+1}^{N} a_m \cdot a_{m-k}^* \cdot \exp(j2\pi nk/N)$$

wherein $\sigma_k$ is an SSBI contribution to be subtracted, $a^*_0$ is a complex conjugate of dc carrier, $a_m$ is complex-valued data on m-th subcarrier, $a^*_{m-k}$ is complex conjugate of the complex-valued data on (m−k)-th subcarrier, j is an imaginary part of a complex number, k is a subcarrier index, n is a digital sample index in time, m is a subcarrier index, and N is a fast Fourier transform (FFT) size in a receiver DSP.

21. The network component of claim 15, wherein the DSP is further configured to calculate the SSBI component by determining $\sigma_k$ according to $$\sigma_k = \frac{1}{|H_k| \cdot a_0^*} \sum_{k=m+1}^{N} a_m \cdot a_{m-k}^* \cdot |H_m| \cdot |H_{m-k}| \exp(j2\pi nk/N)$$

wherein $\sigma_k$ is an SSBI contribution to be subtracted, H is a complex-valued channel response, $a^*_0$ is a complex conjugate of dc carrier, $a_m$ is a complex-valued data on m-th subcarrier, $a^*_{m-k}$ is a complex conjugate of the complex-valued data on (m−k)-th subcarrier, j is an imaginary part of a complex number, k is a subcarrier index, n is a digital sample index in time, m is a subcarrier index, and N is a fast Fourier transform (FFT) size in a receiver DSP.

* * * * *